(12) United States Patent
Partee et al.

(10) Patent No.: US 8,643,974 B1
(45) Date of Patent: Feb. 4, 2014

(54) DYNAMIC REDUCTION OF TAPE STAIN ACCUMULATION ON TAPE HEAD ASSEMBLY ACROSS MULTIPLE ENVIRONMENTS

(75) Inventors: Charles C. Partee, Lyons, CO (US); Keith G. Boyer, Broomfield, CO (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 13/598,090

(22) Filed: Aug. 29, 2012

(51) Int. Cl.
  *G11B 21/02* (2006.01)
  *G11B 5/03* (2006.01)

(52) U.S. Cl.
  USPC ............................................. 360/75; 360/66

(58) Field of Classification Search
  None
  See application file for complete search history.

(56) References Cited

U.S. PATENT DOCUMENTS 7,586,710 B2   9/2009  Partee et al.
2009/0273857 A1*  11/2009  Iben et al. ................. 360/97.02
2013/0128371 A1*  5/2013  Brong et al. .................... 360/31

\* cited by examiner

*Primary Examiner* — Andrew L Sniezek
(74) *Attorney, Agent, or Firm* — Marsh Fischmann & Breyfogle, LLP; Jonathon A. Szumny; Kent A. Lembke (57) ABSTRACT

Systems and methods that sense or obtain environmental conditions of a tape drive and dynamically apply voltage biases to tape head assembly elements based on the sensed/obtained environmental conditions to reduce tape stain accumulation and prolong tape head performance. Detection of different first and second sets of environmental conditions (e.g., in relation to temperatures, humidity levels, tape movement directions, etc.) may result in respective first and second voltage bias level sets being applied to respective first and second head assembly element sets. For instance, different first and second voltage bias level sets may be applied to the same head assembly elements (e.g., the first and second head assembly element sets may be the same), or the first and second voltage bias level sets may be applied to different head assembly elements (e.g., the first and second head assembly element sets may be at least partially different).

20 Claims, 6 Drawing Sheets

| # | ENVIRONMENTS | TOP POLE | BOTTOM POLE | TOP SHIELD | BOTTOM SHIELD | SUBSTRATE | CLOSURE |
|---|---|---|---|---|---|---|---|
| 1 | HOT, DRY, TAPE MOVING IN 1ST DIRECTION | FLOAT | FLOAT | 0V | -3V | 3V | FLOAT |
| 2 | HOT, DRY, TAPE MOVING IN 2ND DIRECTION | FLOAT | FLOAT | 3V | -3V | 0V | FLOAT |
| 3 | HOT, HUMID, TAPE MOVING IN 1ST DIRECTION | -3V | 0V | FLOAT | FLOAT | FLOAT | 3V |
| 4 | HOT, HUMID, TAPE MOVING IN 2ND DIRECTION | -3V | 3V | FLOAT | FLOAT | FLOAT | 0V |
| 5 | COLD, DRY, TAPE MOVING IN 1ST DIRECTION | -3V | 0V | 0V | 3V | 3V | -3V |
| n | .... | | | | | | |

DYNAMIC REDUCTION OF TAPE STAIN ACCUMULATION ON TAPE HEAD ASSEMBLY ACROSS MULTIPLE ENVIRONMENTS

BACKGROUND

1. Field of the Invention

The present invention generally relates to controlling the spacing of a tape head assembly (e.g., including one or more transducers such as a read transducer, a write transducer, or a read/write transducer) relative to a magnetic data storage tape and, more particularly, to controlling such spacing by reducing the buildup of tape stain on the tape head assembly over time.

2. Relevant Background

Tape drive manufacturers are constantly challenged to produce tape drives with larger storage capacity to meet market demands. One way to accomplish this objective is to increase the storage density in the magnetic layer of the tape. By increasing the storage density, the tape may have more tracks for a given area and each track may have more bits.

An important factor affecting the accuracy of the read/write processes and the ability to support higher data densities is magnetic spacing. Generally, magnetic spacing is the distance between the magnetic layer on the tape where the information is recorded and the transducer(s) write and read data. Magnetic spacing is a first-order effect in all magnetic recording systems because increased magnetic spacing degrades write performance (to store data) and read performance (retrieving data) alike. Furthermore, magnetic spacing is a critical parameter because the amplitude of a playback signal decreases exponentially with increasing magnetic spacing. The decrease in amplitude caused by increased magnetic spacing may be referred to as Wallace spacing loss. Increased magnetic spacing increases the width of the read back pulse which leads to reduced data densities. The quality of the write operation also varies with spacing and decreased magnetic spacing improves the quality of the write operation.

Magnetic spacing for a tape drive is typically set in the factory and can change during long term operation (e.g., long term movement of magnetic tape over the tape head assembly). After a sufficient period of time, a steady-state magnetic spacing develops. Magnetic spacing is generally designed to be in the range between 20-50 nm, depending upon product requirements. Generally, smaller magnetic spacing is capable of supporting higher data densities for a given read/write accuracy, while greater magnetic spacing is capable of supporting lower data densities for a given read/write accuracy. If a system is designed to run at high data densities, but the magnetic spacing is too large, an unacceptable drop in read/write accuracy will occur.

One factor that increases magnetic spacing (and thus can lead to read/write accuracy loss) is the accumulation of "tape stain" on the tape head assembly over time during operation of the tape drive. Tape stain formation is believed to be an electro-mechanical-chemical process in which an accumulation (e.g., amalgam) of lubrication products, head wear products, and other detritus produced from the head and tape (during the wear process that continues for the life of the tape drive) builds up on the tape head elements (e.g., shields, poles, substrates, reader elements, and/or the like), and can accumulate in differing amounts and at differing rates based on, among other factors, the particular environment in which the tape drive is operating (e.g., temperature, humidity, and/or the like). The accumulated tape stain increases the magnetic spacing between the head and the tape by physically pushing the tape further away from the head assembly. In some cases, tape stain can be electrically conductive which can cause shorts between film layers in the read transducer that are designed to be isolated and ultimately degrade read performance significantly. Regardless of whether or not it is electrically conductive, tape stain accumulated on the tape head assembly degrades overall performance and is a common cause for drive returns from customers.

One manner of reducing tape stain is via use of a "cleaning tape" having an abrasive surface that removes some of the stain. Upon accumulation of tape stain on a typical head assembly, drive software notes the performance degradation and requests that the tape library or tape operator loads the cleaning tape. In some situations, a cleaning tape can be periodically loaded even when performance degradation has not been noted. Although a common approach to mitigate the tape stain problem in the industry, use of cleaning tapes has significant disadvantages. For instance, use of cleaning tapes is often not completely effective in removing tape stain. Furthermore, cleaning tapes tend to decrease the overall mean time to failure of the head while increasing the cost of ownership of tape drives to customers. Still further, cleaning tapes merely mask the problem of tape stain accumulation by periodically and imperfectly removing the tape stain rather than eliminating or at least limiting the accumulation of the tape stain in the first place.

SUMMARY

Another manner of reducing tape stain accumulation in some environments is to apply a fixed voltage bias to certain elements in a tape head assembly. In the current manner, a fixed voltage bias is applied to the tape head elements irrespective of environment (e.g., temperature, humidity, and/or the like) so that the voltage bias is either beneficial (e.g., it eliminates or at least limits tape stain accumulation) or benign (e.g., it has no or little effect on tape stain accumulation). For instance, applying a voltage bias of 3V on one or more particular tape head assembly elements in a hot, humid environment may reduce tape stain accumulation while the same voltage bias applied to the same tape head assembly elements in a cold, dry environment may have little to no effect on tape stain accumulation. Recently, it has been discovered that different voltage bias levels may have differing effects on tape stain accumulation based upon the particular environment in which the tape drive is operating. Continuing with the above example, a voltage bias of 3V applied to particular tape head assembly elements may be highly effective in eliminating or at least limiting tape stain accumulation in a hot and humid environment while a different voltage bias (e.g., 1V) applied to particular tape head assembly elements may be highly effective in eliminating or at least limiting tape stain accumulation in a cold and dry environment. However, and as discussed above, current manners of reducing tape stain accumulation continue to apply the same voltage bias regardless of the particular environment in which the tape drive is being operated.

Disclosed herein are systems and methods that broadly serve to detect or otherwise obtain one or more environmental conditions or variables of a tape drive and then dynamically apply one or more voltage biases (or bias differences) to one or more elements of the tape head assembly of the tape drive (or between elements) based on the detected/obtained environmental conditions to reduce tape stain accumulation and prolong tape head performance. Stated differently, the disclosed systems and methods are operable to apply voltage biases or differences to or between elements in the tape head assembly that are exposed to the magnetic tape (e.g., shields, poles, substrates, reader elements, and/or the like) at levels directly or substantially tied to the particular environmental conditions of the tape drive. For instance, detection of a first environment may result in a fixed voltage difference being held between two elements (e.g., between top and bottom poles) to limit tape stain accumulation in the first environment. As another example, detection of a second environment may result in one particular element being held at ground and a voltage being applied to another element relative to the grounded element to limit tape stain accumulation in the second environment. Environmental conditions can be determined/obtained and any appropriate voltage level(s) can be set before tape drive operation and/or environmental conditions can be dynamically determined/obtained and any appropriate voltage level(s) can be dynamically set during tape drive operation. Non-limiting examples of environmental conditions that may be detected/obtained include temperature, humidity, altitude, magnetic fields, tape type, tape movement direction relative to tape head elements, and/or the like.

In one aspect, a method of voltage biasing one or more elements of a tape head assembly in a tape drive to limit tape stain accumulation on the tape head assembly includes obtaining a first set of one or more environmental variables of a tape drive that collectively make up a first environment of the tape drive; determining, based on the first environment, a first set of one or more voltage biases to be applied to a first set of one or more elements of a tape head assembly of the tape drive to limit the accumulation of tape stain on the tape head assembly during movement of magnetic tape relative to the tape head assembly in the first environment; and applying the determined first set of one or more voltage biases to the first set of one or more elements of the tape head assembly.

In one arrangement, the method may include obtaining a second set of one or more environmental variables of a tape drive that collectively make up a second environment of the tape drive; determining, based on the second environment, a second set of one or more voltage biases to be applied to a second set of one or more elements of the tape head assembly to limit the accumulation of tape stain on the tape head assembly during movement of the magnetic tape relative to the tape head assembly in the second environment; and applying the determined second set of one or more voltage biases to the second set of one or more elements of the tape head assembly.

In another arrangement, the obtaining may include receiving the one or more environmental variables from one or more sensors, where each sensor measures a physical property and converts the physical property into a corresponding signal, and where the environmental variables are represented by the corresponding signals. For instance, the determining may include accessing a database including a plurality of environmental variables and a plurality of tape head assembly elements and corresponding voltage biases to be applied to the tape head assembly elements to limit tape stain accumulation on the tape head assembly; and using the first set of one or more environmental variables to ascertain the first set of one or more voltage biases to be applied to the first set of one or more elements of the tape head assembly of the tape drive.

In another aspect, a system for limiting tape stain accumulation on a tape head assembly during movement of magnetic tape over the tape head assembly includes a tape head assembly; a sensor that measures a physical property of an environment of the tape head assembly and converts the physical property into a corresponding signal; and a tape drive controller that receives the signal from the sensor and determines, based on the received signal, a voltage bias to be applied to an element of the tape head assembly to limit the accumulation of tape stain on the tape head assembly during movement of magnetic tape relative to the tape head assembly in the environment.

In yet another aspect, a tape head assembly tape stain accumulation reduction system includes a processing module and a memory module logically connected to the processing module and comprising a set of computer readable instructions executable by the processing module to sense environmental variables affecting a degree to which tape stain accumulates on a tape head assembly of a tape drive, wherein the sensed environmental variables collectively make up a sensed environment; and apply, based on the sensed environment, a voltage bias to one or more elements of the tape head assembly to limit tape stain accumulation on the tape head assembly during movement of magnetic tape over the tape head assembly in the sensed environment. For instance, the memory module may include additional sets of computer readable instructions executable by the processing module to sense a plurality of additional environments of the tape drive; and apply, based on the plurality of additional sensed environments, voltage biases to one or more elements of the tape head assembly to limit tape stain accumulation on the tape head assembly during movement of magnetic tape over the tape head assembly in each of the plurality of additional sensed environments.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

DETAILED DESCRIPTION

Disclosed herein are systems and methods that apply voltage biases to one or more tape head assembly elements during operation of a tape drive to reduce or limit tape stain accumulation on the tape head assembly elements, where the voltage biases are applied at levels based on one or more particular environmental conditions of the tape drive. For instance, detection of a first set of environmental conditions (e.g., high temperature, low humidity, tape moving in first direction) may result in a set of voltage bias levels (e.g., between −5V and 5V) being applied to a set of tape head assembly elements (e.g., top pole, bottom pole, substrate) to limit tape stain accumulation in an environment defined by the first set of environmental conditions, and detection of a second set of environmental conditions (e.g., high temperature, high humidity humidity, tape moving in second direction) may result in a set of voltage bias levels (e.g., the same as or different than the voltage bias level set applied for the first set of environmental conditions) being applied to a set of tape head assembly elements (e.g., same as or different than set to which first set of voltage bias levels are applied to) to limit tape stain accumulation in an environment defined by the second set of environmental conditions.

In one arrangement, voltage biases may be applied to the same tape head assembly elements in the first and second environments but at different levels. In another arrangement, voltage biases may be applied to at least some different tape head assembly elements in the first and second environments. As discussed herein, the present systems and methods are applicable to a wide variety of tape head assembly elements (e.g., shields, poles, substrates, reader elements, and/or the like), environmental conditions (e.g., temperature, humidity, altitude, magnetic fields, tape type, tape movement direction relative to tape head elements, and/or the like), voltage bias levels, manners of applying the voltage bias levels, and/or the like.

Figure 1:
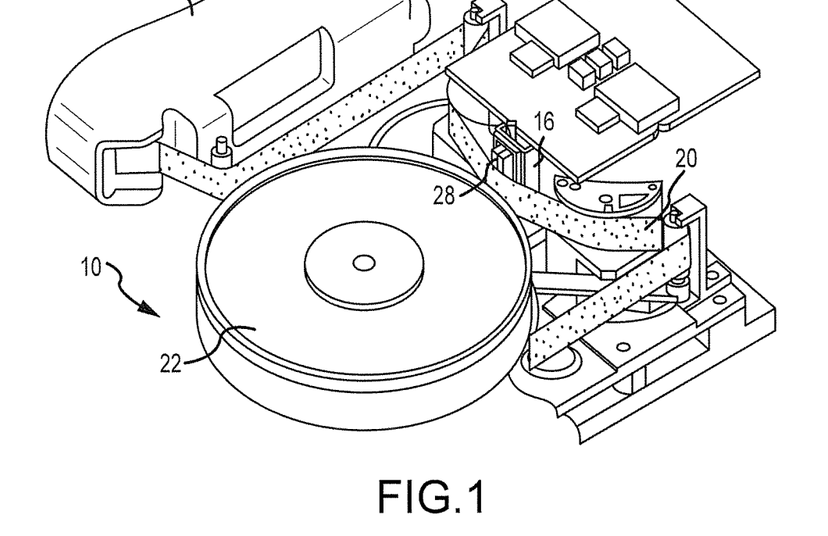
FIG. 1 is a fragmentary perspective view of a tape drive.

Referring to FIG. 1, a tape drive 10 is shown with a tape cartridge 12 loaded into the tape drive 10. The tape drive 10 includes a tape head assembly 16 made up of a plurality of elements such as at least one transducer 28 that may read, write, or read and write data in relation to a length of magnetic tape 20. For instance, the magnetic tape 20 may be fed onto a take-up reel 22 that takes up the magnetic tape 20 fed from the tape cartridge 12 after being fed across the tape head assembly 16. The tape drive 10 may also include at least one tape drive controller 26 (e.g., in the form of a circuit board including any appropriate arrangement of memory, logic, processors, circuitry, and/or the like) to control operation of the tape head assembly 16 (e.g., via receiving and processing signals from a server or the like to read data from and/or write data to the magnetic tape 20). It is to be understood that not all components of the tape drive 10 have been necessarily illustrated or described in the interest of clarity.

Figure 2:
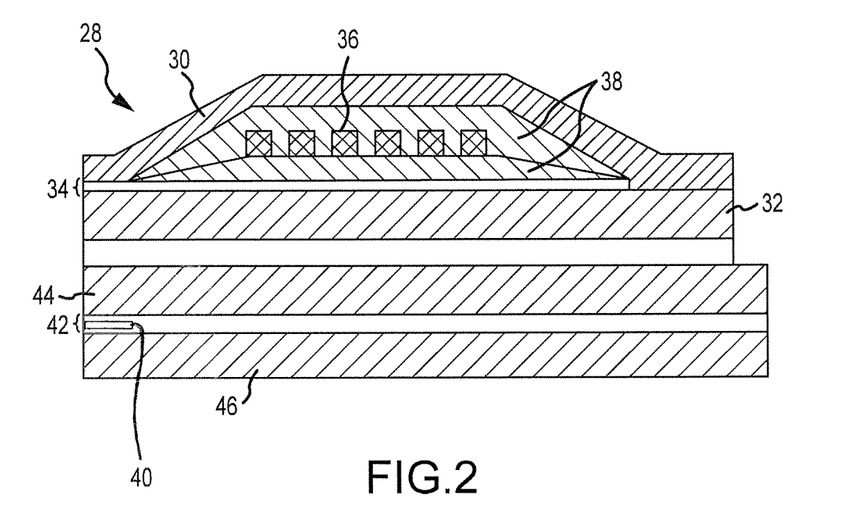
FIG. 2 is a schematic cross-sectional view of a combined read/write head transducer for use with tape head assembly of FIG. 1.

In one arrangement, and as shown in FIG. 2, the transducer 28 may include a top pole 30 and a bottom pole 32 that define a write gap 34 therebetween (e.g., where the write gap 34 may be filled with any appropriate insulator such as alumina, not shown). A plurality of coils 36 embedded in one or more insulation layers 38 may be provided between the top and bottom poles 30, 32. The coils 36 may be energized and the top and bottom poles 30, 32 controlled to write data on the magnetic tape 20 by appropriately changing the status of data bits on the magnetic tape 20. The transducer 28 may also include a read transducer portion made up of a top shield 44, a bottom shield 46, a read gap 42, and a read sensor 40, where the read gap 42 and read sensor 40 are disposed between the top and bottom shields 44, 46. While the tape head assembly 16 has been illustrated as having a single transducer 28 that is operable to both read and write data, other arrangements envision that separate read transducers and write transducers may also be provided without departing from the spirit of the present disclosure.

Figure 3:
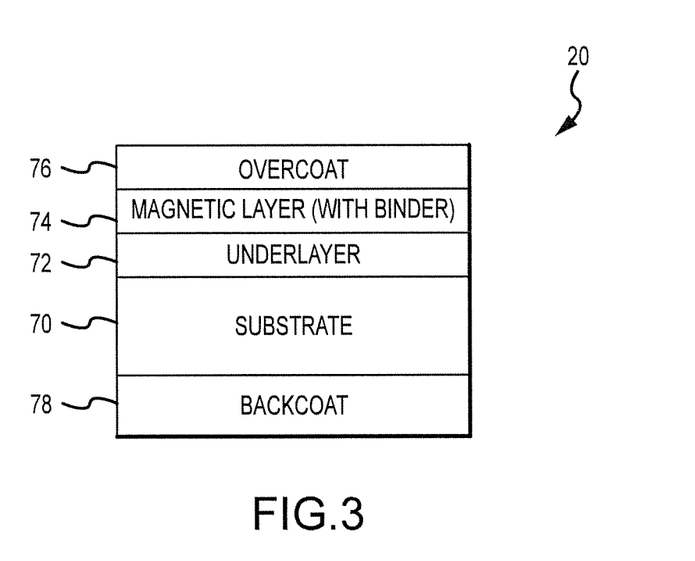
FIG. 3 is a cross-sectional view of a length of magnetic tape for use in the tape drive of FIG. 1.

FIG. 3 presents a cross-sectional view along the thickness of the length of magnetic tape 20 for use with the tape drive 10. The magnetic tape 20 may include a plurality of layers (e.g., films, coatings, and/or the like) of any appropriate materials and thicknesses such as a substrate 70, an underlayer 72, a magnetic layer 74 (e.g., with binder), an overcoat 76, a backcoat 78, and/or the like. One or more of the layers may be optional, one or more of the layers may actually be made up of multiple layers of differing materials, and the layers have not necessarily been shown to proper scale.

Figure 4A:
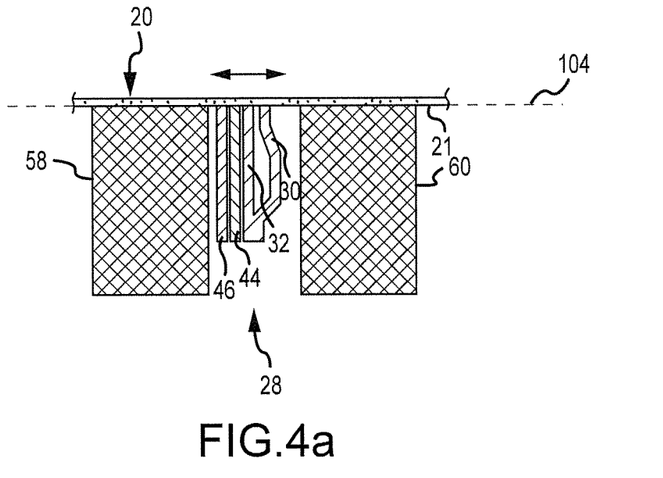
FIG. 4a is a diagrammatic cross-sectional view of the transducer of FIG. 2 mounted within a portion of the tape head assembly of FIG. 1 and illustrating a length of magnetic tape disposed over the transducer, where the tape head assembly is at least generally free of tape stain accumulation and the bottom of the magnetic tape is aligned with a reference line.

Turning now to FIG. 4a, a cross-sectional view of the transducer 28 (with some elements being removed for clarity) as positioned between a substrate 58 and closure 60 of the tape head assembly 16 is shown, where the magnetic tape 20 is generally positionable over the tape head assembly 16 and is movable in first and second opposing directions relative to the transducer 28. As will be discussed in more detail below, FIG. 4a is representative of the situation in which little to no tape stain is presented on the tape head assembly 16 due to implementation of the environmentally-dependent, dynamically applied voltage biasing systems and methods presented herein.

As shown, a bottom 21 of the magnetic tape 20 (e.g., adjacent overcoat 76, see FIG. 3) is generally aligned with a first or reference line 104 to provide a magnetic spacing (i.e., the distance between the magnetic layer 74 (see FIG. 3) of the magnetic tape 20 and the transducer 28 (e.g., the top and bottom poles 30, 32 and the top and bottom shields 44, 46)) that results in highly accurate reading and/or writing of data with respect to the magnetic tape 20 (e.g., where the reference location 104 is based upon data densities, magnetic tape 20 and/or transducer 28 materials, and/or the like). The positioning of the bottom 21 of the magnetic tape 20 relative to transducer 28 may be initially set during manufacturing or the like. While the top of the transducer 28 (e.g., the tops of the top and bottom poles 30, 32 and the top and bottom shields 44, 46) has been illustrated as being generally level with the tops of the substrate 58 and the closure 60 (and thus that the reference line 104 appears to lie within a plane), other arrangements envision that the top of the transducer 28 may be other than level with the tops of the substrate 58 and closure 60, such as recessed a slight amount below the tops of the substrate 58 and closure 60. In this regard, the portion of the reference line 104 overlying the top of the transducer 28 may be slightly recessed below the portion of the reference line 104 overlying the tops of the substrate 58 and closure 60.

As discussed previously, lubrication products, head wear products, other detritus, and/or the like (collectively referred to as tape stain) produced from a tape head assembly and/or magnetic tape (during the wear process that continues for the life of a tape drive) can build up on the various elements (e.g., shields, poles, substrates, reader elements, and/or the like) of the tape head assembly and can accumulate in differing amounts and at differing rates based on the particular environment in which the tape drive is operating (e.g., temperature, humidity, and/or the like). This tape stain accumulation can increase the magnetic spacing between the magnetic layer of the magnetic tape and the read and/or write transducer elements (e.g., shields, poles, etc.) and thus lead to read/write performance degradation.

Figure 4B:
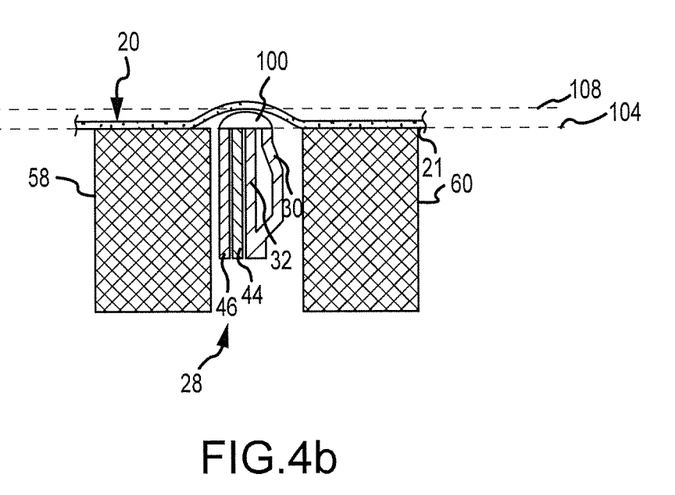
FIG. 4b is a view similar to that in FIG. 4a, but including tape stain accumulation over the transducer of the tape head assembly that physically pushes the bottom of the magnetic tape away from the reference line, thus increasing the magnetic spacing between the magnetic layer of the tape and the transducer of the tape head assembly.

Turning now to FIG. 4b, a cross-sectional view of the tape head assembly 16 and magnetic tape 20 similar to that in FIG. 4a is shown, but after an accumulation 100 (e.g., quantity, mixture, and/or the like) of tape stain has collected over the top and bottom poles 30, 32 and the top and bottom shields 44, 46 of the tape head assembly 16 (e.g., in the absence of the environmentally-dependent, dynamically applied voltage biasing systems and methods presented herein and discussed below). While the tape stain accumulation 100 has been shown as a single amalgam distributed over the top and bottom poles 30, 32 and the top and bottom shields 44, 46 of the tape head assembly 16, it is to be understood that the accumulation 100 could actually be a series of independent amalgams over one or more of the top and bottom poles 30, 32, top and bottom shields 44, 46, substrate 58, closure 60, and/or the like. It is also noted that the accumulation has been exaggerated in size (e.g., in thickness) in relation to the magnetic tape 20, transducer 28, etc.

In any event, it can been seen how, in the absence of the environmentally-dependent, dynamically applied voltage biasing systems and methods presented herein, the tape stain accumulation 100 has physically pushed the bottom 21 of the magnetic tape 20 (e.g., adjacent backcoat 78, see FIG. 3) from the reference line 104 to a second line 108 that is spaced from the first line 104. Stated differently, the tape stain accumulation 100 has spaced or further spaced the bottom 21 of the magnetic tape 20 from the top of the transducer 28. Accordingly, the distance between the magnetic layer 74 (see FIG. 3) of the magnetic tape 20 and the transducer 28 (i.e., the magnetic spacing) has increased which may lead to a reduction in reading and/or writing accuracy of the tape head assembly 16.

Figure 5:
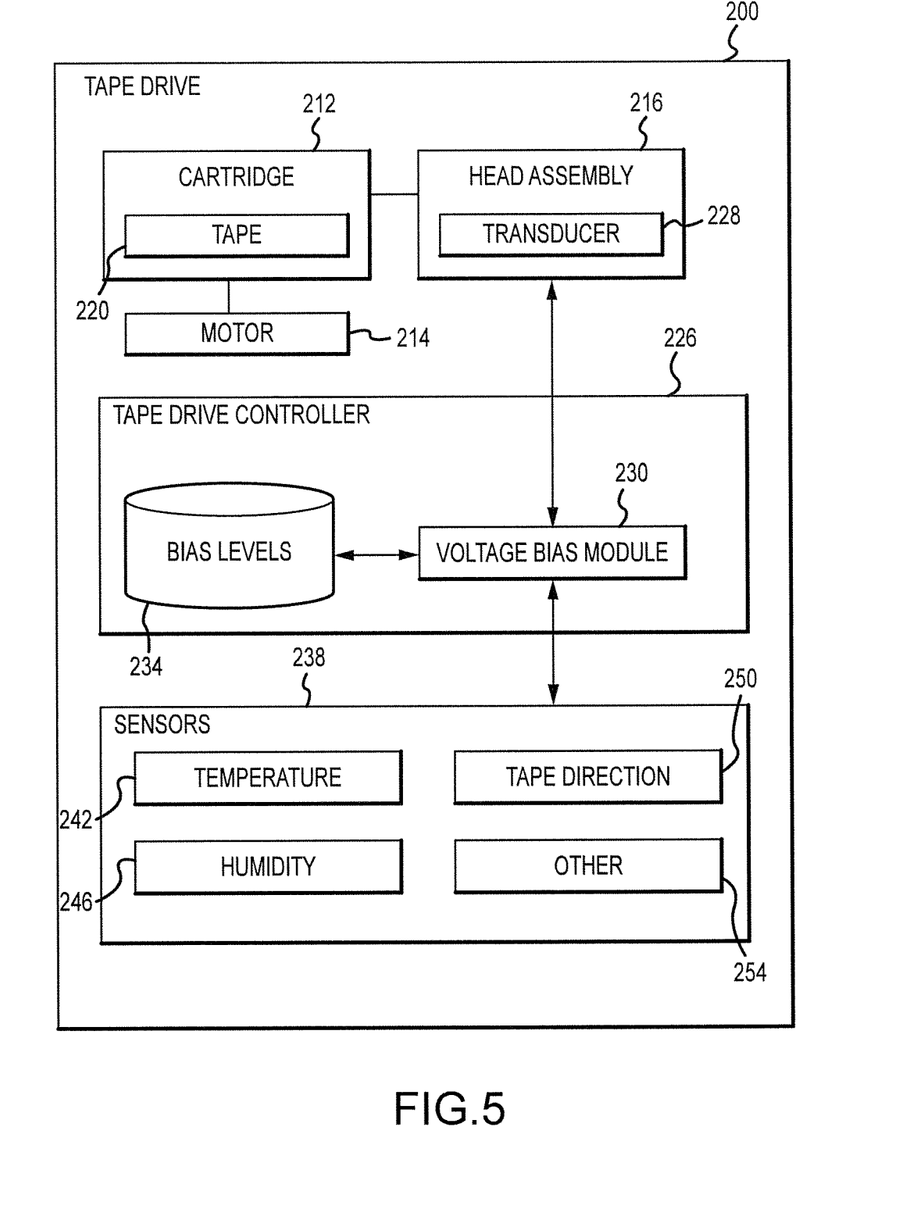
FIG. 5 is a schematic block diagram of a tape drive that incorporates the environmentally-dependent, dynamically applied voltage biasing systems and methods presented herein

Turning now to FIG. 5, a schematic block diagram of a tape drive 200 (e.g., tape drive 10) is illustrated, where the tape drive 200 incorporates the environmentally-dependent, dynamically applied voltage biasing systems and methods presented herein that serve to limit or reduce tape stain accumulation on a tape head assembly 216 (e.g., tape head assembly 16) and thus corresponding reductions in read/write accuracy of the tape head assembly 216. The tape drive 200 includes a tape cartridge 212 (e.g., tape cartridge 12) having magnetic tape 220 (e.g., magnetic tape 20) therein loaded into the tape drive 10, a motor 214 for driving the magnetic tape 220 in first and second opposing directions, the tape head assembly 216 having at least one transducer 228 (e.g., transducer 28) that may read, write, or read and write data in relation to the magnetic tape 220, and at least one tape drive controller 226 (e.g., tape drive controller 26, in the form of a circuit board including any appropriate arrangement of memory, logic, processors, circuitry, and/or the like) to control operation of the tape head assembly 216. It is to be understood that not all components of the tape drive 200 have been necessarily illustrated or described in the interest of clarity.

Figure 7:
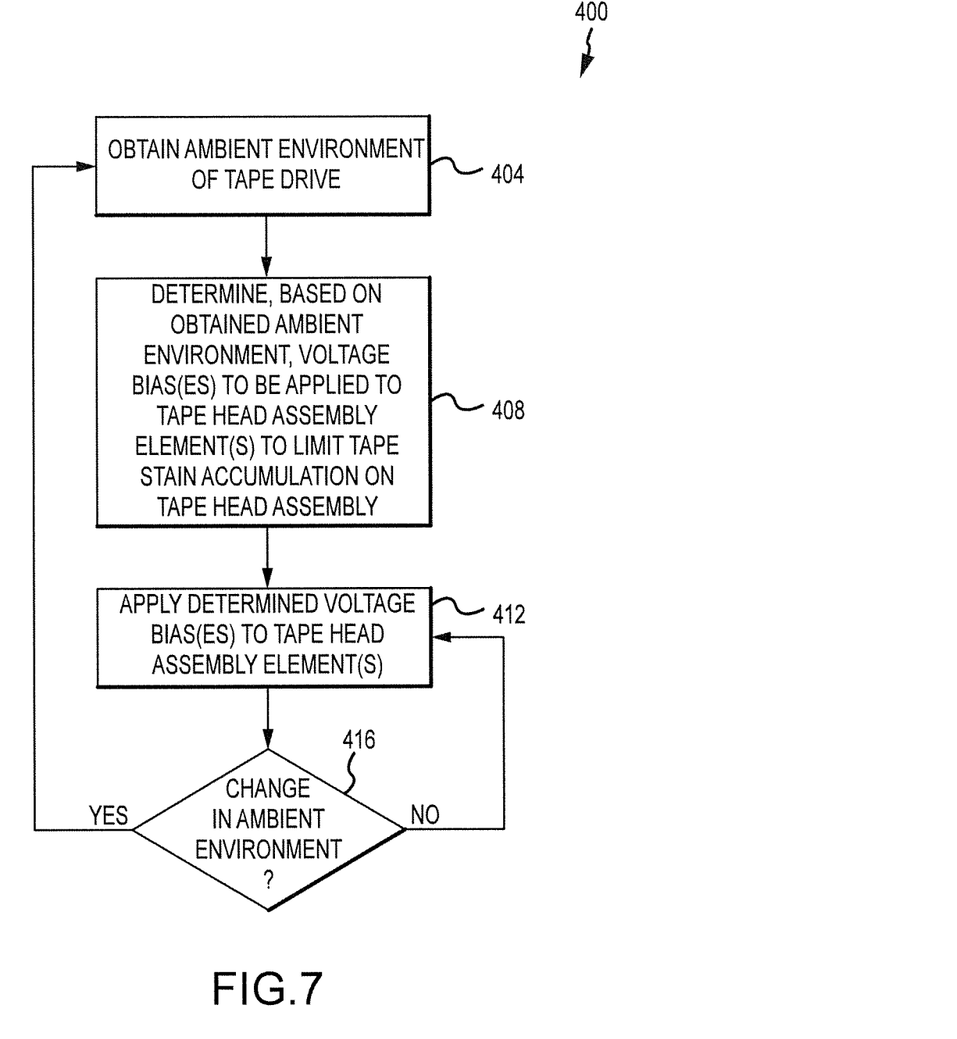
FIG. 7 is a flow diagram illustrating a method of reducing tape stain accumulation on a tape head assembly of a tape drive.

To facilitate the reader's understanding of the present disclosure, reference will now additionally be made to the flow diagram of FIG. 7 which illustrates a method 400 of performing environmentally-dependent, dynamically applied voltage biasing of one or more elements of a tape head assembly of a tape drive for use in reducing or limiting tape stain accumulation on a tape head assembly. As shown in FIG. 7, the method 400 includes obtaining 404 an environment (e.g., ambient conditions) of a tape drive. For purposes of this discussion, an "environment" of a tape drive (e.g., its tape head assembly) may be considered one or more of almost any quality, condition and/or characteristic (e.g., variable) that may have an effect on the degree to which tape stain may form, collect or accumulate on a tape head assembly.

In one arrangement, an environment of a tape drive may include one or more atmospheric-related conditions such as temperature (e.g., 75° F., 55° F., hot, cold, etc.), humidity (e.g., 50%, 20%, humid, moist, dry, etc.), altitude (e.g., 10,000 feet above sea level, high, sea level, etc.), and/or the like. Additionally or alternatively, the tape drive environment may include one or more magnetic tape-related characteristics such as type (e.g., in terms of materials), dimensions (e.g., width, thickness, etc.), direction of movement relative to the tape head assembly (e.g., first, forward direction or a second, opposing reverse direction), and/or the like. Additionally or alternatively, the tape drive environment may include one or more tape head assembly-related characteristics such as number of head assembly elements or transducers, types of elements or transducers (e.g., in terms of materials or functions), magnetic fields, and/or the like. Numerous other qualities, conditions, characteristics and/or variables are also envisioned as collectively making up a tape drive's environment and are encompassed within the scope of the present disclosure.

For instance, the tape drive 200 may include a plurality of sensors 238 that are operable to respectively measure or determine variables about the tape drive's 200 environment and send or report (e.g., via any appropriate circuitry, network, and/or the like) the determined variables to a voltage bias module 230 (e.g., logic, computer-readable instructions, and/or the like generally operable to coordinate or cause the application of voltage biases to the head assembly based on sensed environment variables of the tape drive 200) of the tape drive controller 226 for further processing as will be discussed below. In one arrangement, at least one of the sensors 238 may be in the form of a device designed and arranged to directly measure a physical quantity (e.g., temperature, humidity, and/or the like) and convert the physical quantity into an electronic or digital signal representing the corresponding environmental variable and that can be interpreted by the voltage bias module 230. For instance, in the case of a temperature sensor 242 (e.g., thermocouple) or a humidity sensor 246 (e.g., humistor), the sensors 242, 246 may be appropriately integrated into a circuit board of the tape drive 200 and configured to communicate corresponding signals to the voltage bias module 230.

In another arrangement, at least one of the sensors 238 may be in the form of a pre-existing or additional piece of logic or set of computer-readable instructions built into the tape drive controller 226 that is operable to measure or determine a magnetic tape or tape head assembly-related characteristic of the environment. For instance, a tape direction sensor 250 may be in the form of logic operable to query and determine a direction of movement of the magnetic tape 220 and report the same to the voltage bias module 230. The sensors 238 may additionally and/or alternatively include one or more other sensors 254. For instance, one of the other sensors 254 may be an RFID reader operable to interrogate an RFID tag on the tape cartridge 212 to determine magnetic tape-related characteristics. While the sensors 238 have been shown in FIG. 5 as being part of the tape drive 200 but separate from the tape drive controller 226, one or more of the sensors 238 could form part of the tape drive controller 226 or alternatively could be entirely separate from (but still in communication with) the tape drive 200.

In any event, and upon the voltage bias module 230 obtaining a first set of one or more environmental variables from the sensors 238 (e.g., initiated either by the voltage bias module 230 or by the sensors 238 themselves) in any appropriate manner (e.g., according to a regular schedule, upon a change in an environmental variable, manually by a user, and/or the like), the voltage bias module 230 may then proceed to determine 408, based on the obtained environmental variables (which collectively make up an ambient environment of the tape drive 200), a first set of one or more voltage biases to be applied to a first set of one or more elements of the tape head assembly 216 (or voltage bias differences between two or more tape head assembly elements) to limit tape stain accumulation on the tape head assembly 216 in the particular environment. As used herein, a "set" may encompass one or more of the corresponding variables, voltage biases or elements (e.g., a first set of environmental variables may include only a single environmental variable or a plurality of environmental variables). In any event, the determined first set of one or more voltage biases may include specific or relative voltage biases or voltage bias differences that, when applied to or held between elements of the tape head assembly 216 in the ambient environment of the tape drive 200, results in decreased accumulation of tape stain (e.g., tape stain 100 in FIG. 4b) on the tape head assembly 216 (e.g., on one or more of the substrate 68, closure 60, top and bottom poles 30, 32, top and bottom shields 44, 46, etc.) as compared to in the absence of the applied voltage biases or voltage bias differences.

Figure 6:
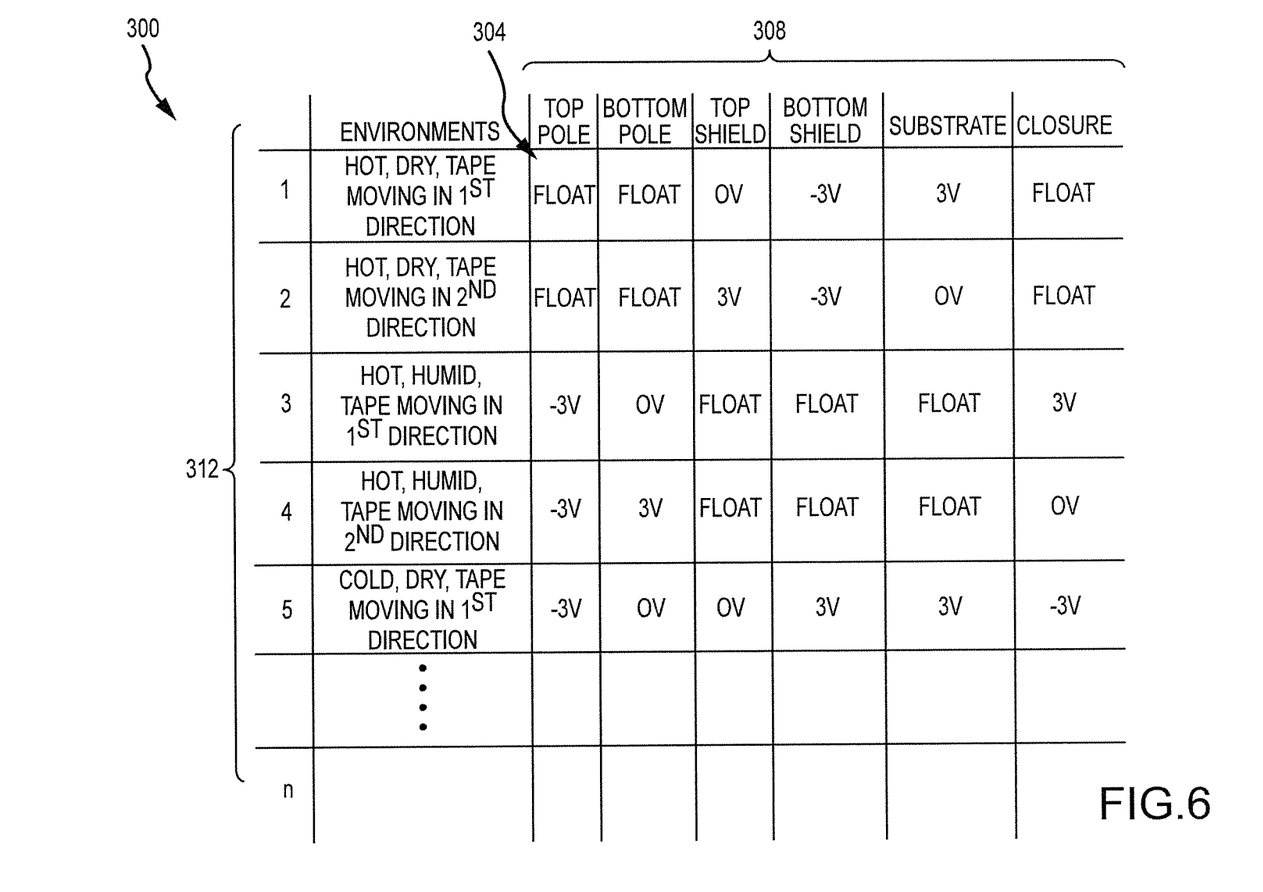
FIG. 6 is a table illustrating tape head assembly element voltage bias levels for various environmental conditions, according to an example.

In one arrangement, the determining 408 may include accessing a database 234 using the first set of one or more environmental variables to ascertain the first set of voltage biases or voltage bias differences to be applied to the first set of tape head assembly elements to limit tape stain accumulation thereon (e.g., during tape drive operation in the ambient environment). For instance, FIG. 6 illustrates a representative database or table 300 including a plurality of voltage biases 304 (or voltage bias levels) to be applied to a plurality of tape head assembly elements 308 at each of a number of environments 312 of a tape drive (e.g., the tape drive 10 or 200). With reference to "Environment #2" 312 (made up of the environmental variables "hot," "dry," and "tape moving in second direction"), it can be seen how, merely for purposes of example, voltage biases of 3V and −3V are to be respectively applied to top and bottom shields (e.g., top and bottom shields 44, 46 in FIG. 4b) of the tape head assembly 216 relative to a substrate (e.g., substrate 58 in FIG. 4b) of the tape head assembly 216 which is to be held at ground.

Stated differently, a first tape head assembly element (e.g., the substrate) may be held at ground, while respective voltage biases (e.g., the same or different) may be effected at one or more other tape head assembly elements, such as second and third tape head assembly elements (e.g., the top and bottom shields), relative to the first tape head assembly element. Furthermore, it can be seen how, merely for purposes of example, top and bottom poles (e.g., top and bottom poles 30, 32 in FIG. 4b) and a closure (e.g., closure 60) of the tape head assembly 216 are to be allowed to float relative to the voltages applied to elements around them. For instance, one or more of the portions of the table 300 can be populated via empirical and/or theoretically derived data with a goal of limiting tape stain accumulation.

In another arrangement, the voltage bias module 230 may include or have access to any appropriate set of derived equations or logic that, when processed with the obtained environmental variables, outputs one or more voltage bias levels or differences to be applied to one or more tape head assembly elements. Stated differently, the determining 408 may include inputting sensed or obtained environmental variables into any appropriate logic and receiving corresponding outputted voltage biases or differences to be applied to or held between tape head assembly elements. For instance, upon the voltage bias module 230 receiving from the temperature sensor 242 a signal that the ambient temperature is 71° F., the ambient humidity is 30% and the tape is moving in the second direction, the voltage bias module 230 may input such variables into any appropriate equation set or logic and receive a corresponding output with appropriate voltage biases or differences to be applied or held to or between tape head assembly elements.

In one embodiment, each of one or more of the environmental variables may be broken up into a plurality of successive ranges, such that relative changes within a particular range may not result in changes to the applied voltage biases or differences. For instance, all temperatures between 70-75° F. may be considered "warm" and may result in the same outputted voltage biases or differences (e.g., assuming all other environmental variables remained constant). In one variation, fuzzy logic may be appropriately implemented so that instead of working with absolute values or labels, relative degrees to which an environmental variable is resident within a particular set may be utilized to determine corresponding voltage biases or differences. For instance, upon receiving a temperature of 70° F., the voltage bias module 230 may determine that such a temperature is "slightly warm" (as 70° F. is at the bottom of the 70° F.-75° F. "warm" range) and then use the "slightly warm" variable (with any other environmental variables, e.g., "very humid," "low altitude," etc.) to determine corresponding voltage biases and/or differences.

Returning to FIG. 7, the method 400 may also include effecting or applying 412 the determined or calculated voltage bias(es) or bias differences to one or more tape head assembly elements to limit tape stain accumulation on the tape head assembly in the ambient environment obtained at step 404. In accordance with "Environment #2" 312 in FIG. 6, for instance, the voltage bias module 230 may cause (e.g., via any appropriate circuitry) voltage biases of 3V and −3V to be respectively applied to the top and bottom shields relative to the grounded substrate, and may allow the top and bottom poles and closure to float relative to the voltages of the elements around them. In some arrangements, a relative voltage difference may be applied between particular tape head assembly elements instead of absolute voltage biases relative to a grounded element (as in the above example). For instance, instead of respectively applying voltage biases of 3V and −3V to the top and bottom shields relative to the grounded substrate, a voltage bias difference (e.g., 6V) may be held between the top and bottom shields irrespective of the actual voltage of the top and bottom shields. That is, the actual voltages of the top and bottom shields may be allowed to float so long as the particular voltage bias difference is maintained (e.g., 4V and 10 V, −3V and 3V, 0V and 6V, and/or the like).

The method 400 may query at 416 whether there has been a change in the ambient environment of the tape drive 200. A change in the ambient environment could be sensed by one of the sensors 238 and communicated to the voltage bias module 230 (e.g., a temperature change could be sensed by the temperature sensor 242 and reported to the voltage bias module 230), determined directly by the voltage bias module (e.g., determine that the magnetic tape 220 has reversed directions), manually communicated to the voltage bias module 230 by a user, and/or the like. In response to a negative answer to the query at 416, the method 400 may continue to apply 412 the determined voltage biases or differences to the one or more tape head assembly elements (e.g., during operation of the tape drive 200, such as during movement of the magnetic tape 220 past the tape head assembly 216).

In response to an affirmative answer to the query at 416, the voltage bias module 230 may proceed to obtain 404 a second set of environmental variables (e.g., including at least one new or updated environmental variable) making up the new or second ambient environment (e.g., where the previous ambient environment was an old or first ambient environment); determine 408, based on the second environment, a second set of voltage biases or differences to be applied to a second set of tape head assembly elements (e.g., via accessing the table 300 with the obtained environmental variables, via inputting the obtained environmental variables into any appropriate logic, and/or the like); and apply 412 the determined second set of voltage biases or differences to the second set of tape head assembly elements to limit the accumulation of tape stain on the tape head assembly 216 during movement of the magnetic tape 220 relative to the tape head assembly 216 in the second environment. In one arrangement, the first and second sets of tape head assembly elements to which voltage biases or different are to be applied or held may be the same (e.g., they both include the top shield, bottom shield and substrate) while the first and second sets of voltage biases are different (e.g., the top shield, bottom shield and substrate could be respectively set to 3V, −3V and 0V in the first set; and the top shield, bottom shield and substrate could be respectively set to 0V, 3V and −3V in the second set). In another arrangement, the first and second sets of tape head assembly elements to which voltage biases are applied may be different.

With reference again to the table 300 of FIG. 6, imagine the ambient environment of the tape drive 200 was now that of "Environment #4" 312 (e.g., hot, humid, magnetic tape moving in second direction). For instance, the humidity level in the area in which the tape drive 200 was operating increased to a "humid" level or the tape drive 200 was moved into a more humid environment. In any event, it can be seen (merely for purposes of example) how the top pole, bottom pole, and closure are to be respectively set to −3V, 3V, and 0V while the top shield, bottom shield and substrate are to be allowed to float relative to the voltages of the elements around them. Again, the method 400 may flow to 416 to query whether there has been a change in the ambient environment of the tape drive 200 and proceed back to 412 or 404 accordingly. In some situations, the outputted voltage biases or difference may be the same as the current settings. For example, in the situation where the only difference between the first and second environments was an increase in temperature from 71° F. to 72° F., the voltage bias module 230 may determine that both such temperatures both fall within a common "warm" temperature range thus resulting in the same outputted voltage biases or differences between the first and second environments.

It is envisioned that either discrete or continuously variable voltage biases or differences may be applied to or held between one or more the various tape head assembly elements (e.g., top and bottom poles, top and bottom shields, substrate, closure, etc.). In one arrangement, outputted or determined voltage biases or differences may be continuously variable within any appropriate range(s) (e.g., between −5V and 5V) such that even small changes in a particular environmental variable may result in a corresponding change in one or more of the voltage biases or differences applied to or held between tape head assembly elements. For instance, a change in temperature from 71° F. to 72° F. could result in a corresponding change in voltage biases applied to the top shield, bottom shield and substrate from −0.3V, −3.8V and 3.1V respectively to −0.2V, −3.4V and 2.5V respectively. In another arrangement, outputted or determined voltage biases or differences may include one or more of a number of discrete values. As just one example, each of the substrate 58 and closure 60 (see FIG. 4a) may be allowed to assume values of 3V, ground or −3V and each of the top and bottom poles 30, 32 and top and bottom shields 44, 46 may be allowed to assume values of 3V, floating or −3V.

It will be readily appreciated that many additions and/or deviations may be made from the specific embodiments disclosed in the specification without departing from the spirit and scope of the invention. For instance, while the tape drive controller 26/226 has been shown and discussed as forming part of the tape drive 10/200, other arrangements encompassed within the present teachings envision that the tape drive controller 26/226 (e.g., circuit board, logic, etc.) may actually be resident separate from the tape drive 10/200 (e.g., in the case where a single tape drive controller 26/226 controlled operation of a plurality of tape drives 10/200). As another example, the tape drive controller 26/226 may in some arrangements include an analog-to-digital converter that is operable to receive analog signals representative of physical properties from one or more of the sensors 238 and convert such signals into corresponding digital signals that can be processed by the voltage bias module 230 to determine corresponding voltage biases or differences. As a further example, the tape drive controller 26/226 may in some arrangements include a data logger (e.g., including microprocessor, internal memory, and/or the like) that is operable to receive signals representing environmental conditions from one or more of the sensors 238 and report the signals to the voltage bias module 230 to determine corresponding voltage biases or differences.

Embodiments disclosed herein can be implemented as one or more computer program products, i.e., one or more modules of computer program instructions encoded on a computer-readable medium for execution by, or to control the operation of, data processing apparatus. For example, the logic or software of the tape drive controller 26/226 may be provided in such computer-readable medium of the tape drive 10/200 (e.g., on a circuit board) and executed by a corresponding processor or processing engine (not shown). The computer-readable medium can be a machine-readable storage device, a machine-readable storage substrate, a non-volatile memory device, a composition of matter affecting a machine-readable propagated signal, or a combination of one or more of them. In this regard, the tape drive 10/200 may encompass one or more apparatuses, devices, and machines for processing data, including by way of example a programmable processor, a computer, or multiple processors or computers. In addition to hardware, the tape drive 10/200 may include code that creates an execution environment for the computer program in question, e.g., code that constitutes processor firmware, a protocol stack, a database management system, an operating system, or a combination of one or more of them.

A computer program (also known as a program, software, software application, script, or code) used to provide any of the functionalities described herein can be written in any appropriate form of programming language including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program may include, by way of example, both general and special purpose microprocessors, and any one or more processors of any kind of digital computer. Generally, a processor will receive instructions and data from a read-only memory or a random access memory or both. Generally, the elements of a computer are one or more processors for performing instructions and one or more memory devices for storing instructions and data. The techniques described herein may be implemented by a computer system configured to provide the functionality described.

While this specification contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

We claim:

1. A method of voltage biasing one or more elements of a tape head assembly of a tape drive to limit tape stain accumulation on the tape head assembly, comprising:
    obtaining a first set of one or more environmental variables of a tape drive that collectively make up a first environment of the tape drive;
    determining, based on the first environment, a first set of one or more voltage biases to be applied to a first set of one or more elements of a tape head assembly of the tape drive to limit the accumulation of tape stain on the tape head assembly during movement of magnetic tape relative to the tape head assembly in the first environment;
    applying the determined first set of one or more voltage biases to the first set of one or more elements of the tape head assembly;
    obtaining a second set of one or more environmental variables of a tape drive that collectively make up a second environment of the tape drive;
    determining, based on the second environment, a second set of one or more voltage biases to be applied to a second set of one or more elements of the tape head assembly to limit the accumulation of tape stain on the tape head assembly during movement of the magnetic tape relative to the tape head assembly in the second environment; and
    applying the determined second set of one or more voltage biases to the second set of one or more elements of the tape head assembly, wherein the first and second sets of one or more elements of the tape head assembly are different.

2. The method of claim 1, wherein either of the obtaining steps comprises:
    receiving the one or more environmental variables from one or more sensors, wherein each sensor measures a physical property and converts the physical property into a corresponding signal, and wherein the environmental variables are represented by the corresponding signals.

3. The method of claim 1, wherein the one or more environmental variables are selected from the group consisting of temperature of the tape drive, humidity adjacent the tape drive, altitude of the tape drive, magnetic fields associated with the tape drive, magnetic tape type, and direction of movement of the magnetic tape relative to the tape head assembly.

4. A method of voltage biasing one or more elements of a tape head assembly of a tape drive to limit tape stain accumulation on the tape head assembly, comprising:
    obtaining a first set of one or more environmental variables of a tape drive that collectively make up a first environment of the tape drive;
    determining, based on the first environment, a first set of one or more voltage biases to be applied to a first set of one or more elements of a tape head assembly of the tape drive to limit the accumulation of tape stain on the tape head assembly during movement of magnetic tape relative to the tape head assembly in the first environment, wherein the determining comprises:
        accessing a database comprising a plurality of environmental variables and a plurality of tape head assembly elements and corresponding voltage biases to be applied to the tape head assembly elements to limit tape stain accumulation on the tape head assembly; and
        using the first set of one or more environmental variables to ascertain the first set of one or more voltage biases to be applied to the first set of one or more elements of the tape head assembly of the tape drive; and applying the determined first set of one or more voltage biases to the first set of one or more elements of the tape head assembly.

5. The method of claim 4, further comprising:

obtaining a second set of one or more environmental variables of a tape drive that collectively make up a second environment of the tape drive;

determining, based on the second environment, a second set of one or more voltage biases to be applied to a second set of one or more elements of the tape head assembly to limit the accumulation of tape stain on the tape head assembly during movement of the magnetic tape relative to the tape head assembly in the second environment; and applying the determined second set of one or more voltage biases to the second set of one or more elements of the tape head assembly.

6. The method of claim 5, wherein the first and second sets of one or more voltage biases are different.

7. The method of claim 6, wherein the first and second sets of one or more elements of the tape head assembly are the same.

8. The method of claim 4, wherein the obtaining comprises:

receiving the one or more environmental variables from one or more sensors, wherein each sensor measures a physical property and converts the physical property into a corresponding signal, and wherein the environmental variables are represented by the corresponding signals.

9. The method of claim 4, wherein the applying comprises:

holding a fixed voltage difference between first and second tape head assembly elements, wherein the absolute voltages of the first and second tape head assembly elements float.

10. The method of claim 4, wherein the one or more environmental variables are selected from the group consisting of temperature of the tape drive, humidity adjacent the tape drive, altitude of the tape drive, magnetic fields associated with the tape drive, magnetic tape type, and direction of movement of the magnetic tape relative to the tape head assembly.

11. The method of claim 4, wherein the one or more elements of the tape head assembly are selected from the group consisting of a transducer, a substrate, and a closure.

12. The method of claim 11, wherein the transducer comprises a plurality of elements selected from the group consisting of poles and shields.

13. A method of voltage biasing one or more elements of a tape head assembly of a tape drive to limit tape stain accumulation on the tape head assembly, comprising:

obtaining a first set of one or more environmental variables of a tape drive that collectively make up a first environment of the tape drive;

determining, based on the first environment, a first set of one or more voltage biases to be applied to a first set of one or more elements of a tape head assembly of the tape drive to limit the accumulation of tape stain on the tape head assembly during movement of magnetic tape relative to the tape head assembly in the first environment; and applying the determined first set of one or more voltage biases to the first set of one or more elements of the tape head assembly, wherein the applying comprises:

holding a first of the tape head assembly elements at ground; and effecting a voltage bias at a second of the tape head assembly elements relative to the first tape head assembly element.

14. The method of claim 13, further comprising:

effecting a voltage bias at a third of the tape head assembly elements relative to the first tape head assembly element.

15. The method of claim 14, wherein the voltage bias effected at the second tape head assembly element is different that the voltage bias effected at the third tape head assembly element.

16. The method of claim 13, further comprising:

obtaining a second set of one or more environmental variables of a tape drive that collectively make up a second environment of the tape drive;

determining, based on the second environment, a second set of one or more voltage biases to be applied to a second set of one or more elements of the tape head assembly to limit the accumulation of tape stain on the tape head assembly during movement of the magnetic tape relative to the tape head assembly in the second environment; and applying the determined second set of one or more voltage biases to the second set of one or more elements of the tape head assembly.

17. The method of claim 16, wherein the first and second sets of one or more voltage biases are different.

18. The method of claim 17, wherein the first and second sets of one or more elements of the tape head assembly are the same.

19. The method of claim 13, wherein the obtaining comprises:

receiving the one or more environmental variables from one or more sensors, wherein each sensor measures a physical property and converts the physical property into a corresponding signal, and wherein the environmental variables are represented by the corresponding signals.

20. The method of claim 13, wherein the one or more environmental variables are selected from the group consisting of temperature of the tape drive, humidity adjacent the tape drive, altitude of the tape drive, magnetic fields associated with the tape drive, magnetic tape type, and direction of movement of the magnetic tape relative to the tape head assembly.

* * * * *

UNITED STATES PATENT AND TRADEMARK OFFICE
CERTIFICATE OF CORRECTION

| | | |
|---|---|---|
| PATENT NO. | : 8,643,974 B1 | Page 1 of 1 |
| APPLICATION NO. | : 13/598090 | |
| DATED | : February 4, 2014 | |
| INVENTOR(S) | : Partee et al. | |

It is certified that error appears in the above-identified patent and that said Letters Patent is hereby corrected as shown below:

In the Specification

In column 5, line 28, delete "humidity humidity," and insert -- humidity, --, therefor.

Signed and Sealed this
Twenty-fourth Day of June, 2014

Michelle K. Lee
*Deputy Director of the United States Patent and Trademark Office*